Nov. 20, 1951     T. D. ENSEY ET AL     2,575,659
JACK
Filed April 8, 1948     3 Sheets-Sheet 1
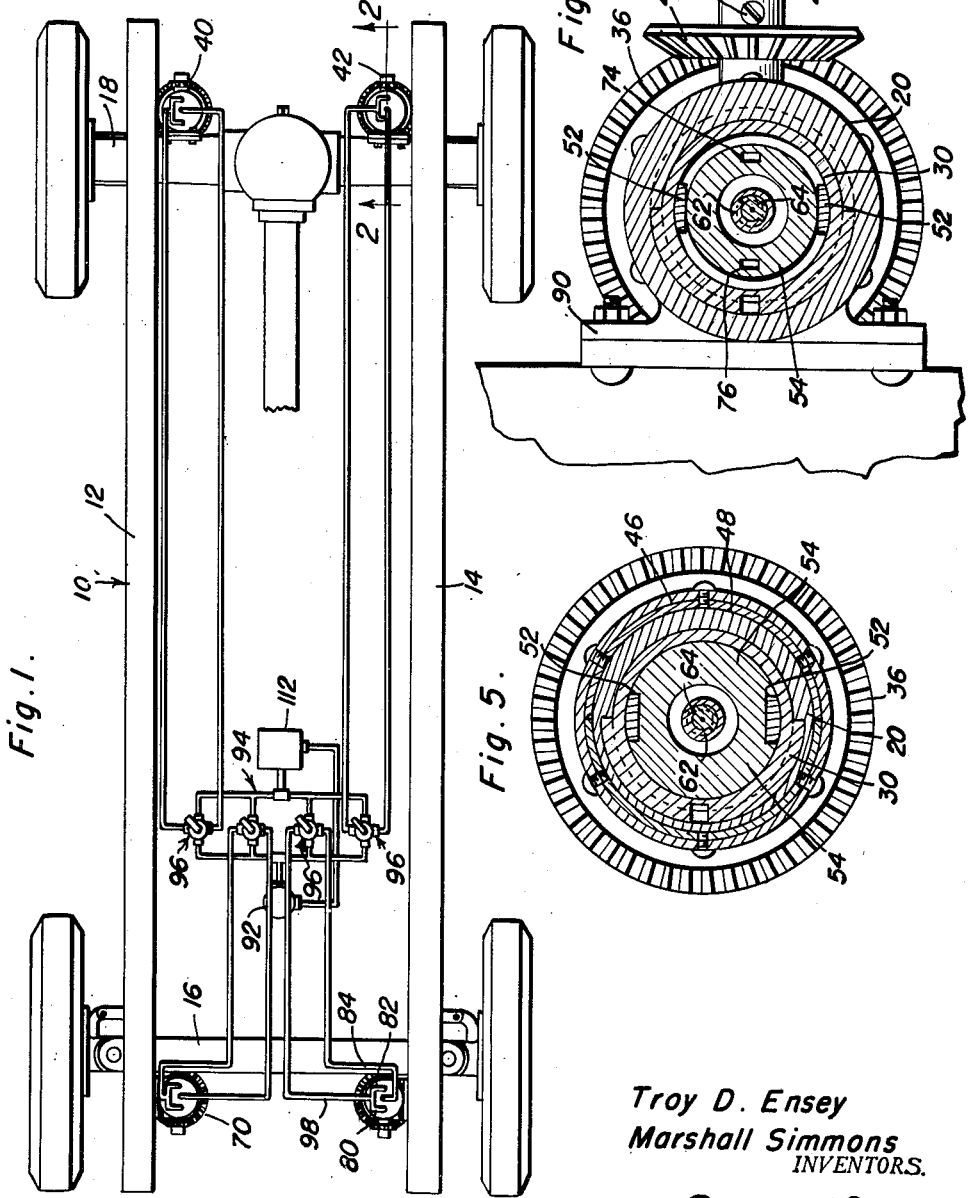
Troy D. Ensey
Marshall Simmons
INVENTORS.

Nov. 20, 1951     T. D. ENSEY ET AL     2,575,659
JACK
Filed April 8, 1948     3 Sheets-Sheet 2
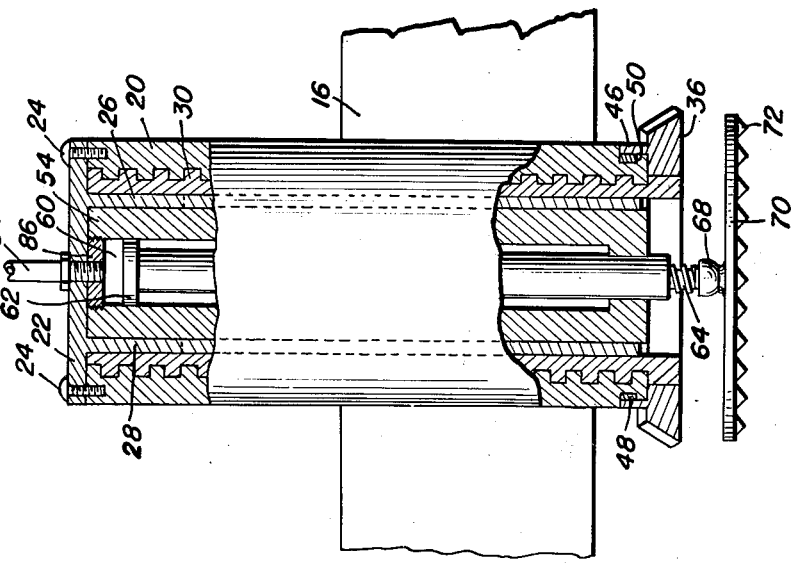
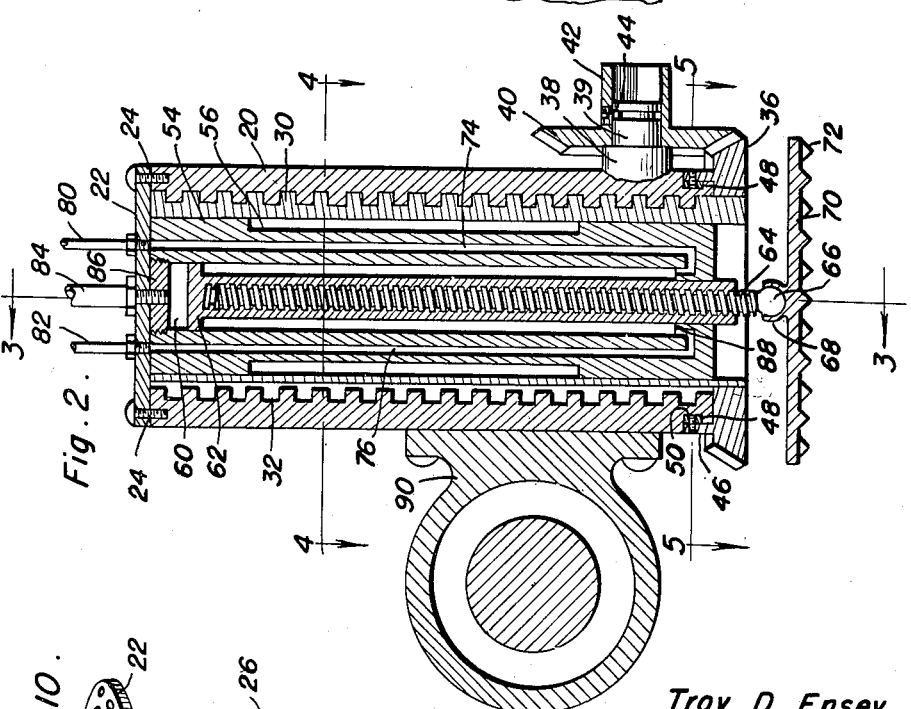
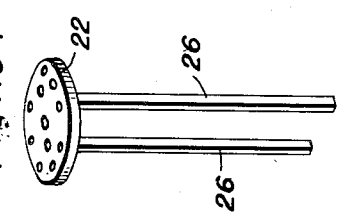
Troy D. Ensey
Marshall Simmans
INVENTORS.

Nov. 20, 1951 T. D. ENSEY ET AL 2,575,659
JACK
Filed April 8, 1948 3 Sheets-Sheet 3

Troy D. Ensey
Marshall Simmons
INVENTORS.

BY
Attorneys

Patented Nov. 20, 1951

2,575,659

UNITED STATES PATENT OFFICE 2,575,659

JACK

Troy D. Ensey, Scappoose, and Marshall Simmons, Portland, Oreg.; said Ensey assignor to said Simmons Application April 8, 1948, Serial No. 19,813

5 Claims. (Cl. 254—86)

This invention relates to novel and useful improvements in jacks for use in association with vehicles.

An object of this invention is to maintain jacks secured to the under-carriage of a conventional vehicle which are operative both by hydraulic means and also by mechanical means.

Another object of this invention is to provide a plurality of jacks which are secured to the under-carriage of a conventional vehicle, which are actuatable from the interior of the vehicle.

A still further object of this invention is to raise selected wheels, or if desired, all of the wheels simultaneously of a vehicle by improved means.

Ancillary objects and features of novelty will become apparent to those skilled in the art, in following the description of the preferred form of the invention, illustrated in the accompanying drawings, wherein:

Figure 1 is a plan view of the under-carriage of a vehicle having the invention associated therewith.

Figure 2 is a sectional view taken on the line 2—2 of Figure 1;

Figure 3 is a longitudinal sectional view taken substantially on the line 3—3 of Figure 2 and in the direction of the arrows;

Figure 4 is a transverse sectional view taken on the line 4—4 of Figure 2 and in the direction of the arrows;

Figure 5 is a sectional view taken on the line 5—5 of Figure 2 and in the direction of the arrows;

Figure 10 is a perspective view of the cap of the jack housing.

Figure 7:
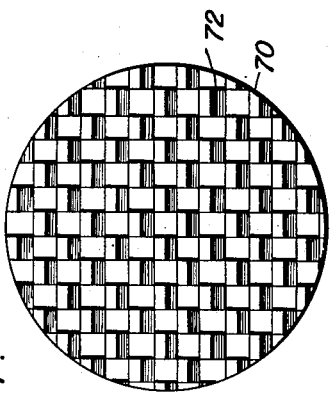
Figure 7 is a bottom plan view of one form of ground gripper utilized in association with the invention.
Figure 8:
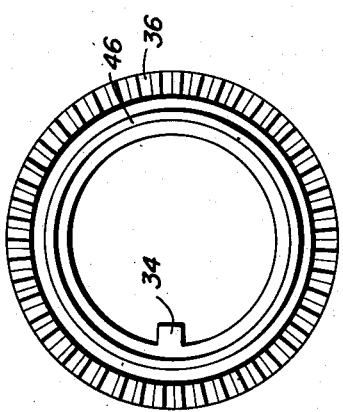
Figure 8 is an elevational view of the relatively large gear utilized in association with the jack.
Figure 6:
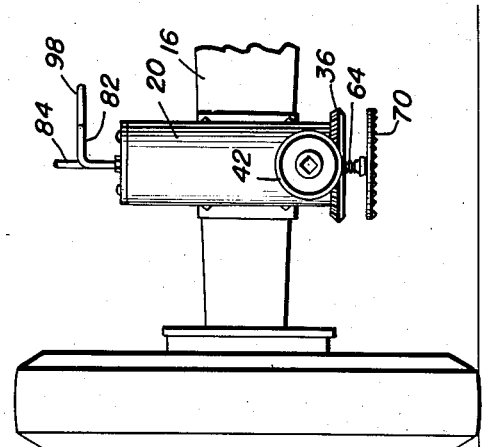
Figure 6 is an elevational view of a portion of the under-carriage of the vehicle, showing the preferred form of the jack associated therewith.
Figure 9:
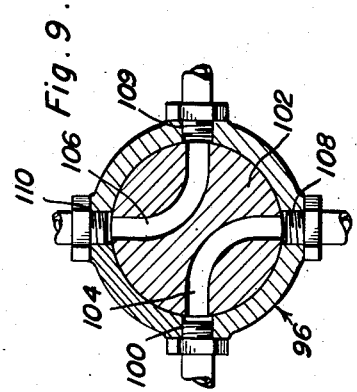
Figure 9 is a sectional view of one of the valves forming a part of the present invention, being utilized in association therewith.

It is one of the prime purposes of the present invention to supply lifts or jacks adjacent each wheel of the conventional vehicle with dual means for actuating the said jack. The dual means consists of a manually operative portion of the preferred form of the invention and a hydraulically actuated portion which is usable either individually or simultaneously as desired.

Of course, when the mechanical actuation is utilized, the hydraulic actuation may be effected for the purpose of extending the jacks to a relatively larger throw or extent.

Referring primarily to Figure 1, a conventional vehicle under-carriage is illustrated and is generally indicated at 10. This under-carriage includes the chassis members 12 and 14, respectively, as well as the front axle housing 16 and rear axle housing 18. For convenience, the jacks are secured to the axle housing adjacent each of the conventional four wheels of a vehicle. However, it is readily appreciated that the jacks may be secured to any portion of the under-carriage of the vehicle wherein it is found expedient.

The specific structure of the jacks may be seen best by correlation of Figures 2 and 3, wherein there is disclosed an outer housing 20 having internal threads. This outer housing has a cap 22 secured thereto by means of conventional screws 24 or the like. Prongs 26 and 28, respectively, are rigidly secured to the said cap or top 22 and depend within the said housing 20.

A sleeve 30 having external threads cooperable with the internal threads of the said housing 20 is provided therein and a keyway 32 is formed longitudinally of the said sleeve 30. This keyway is adapted to receive a lug or key 34 therein which is secured to a relatively large gear 36, to be described subsequently.

A boss 38 is rigidly secured to the said housing 20 and has a reduced portion 39. A pinion 40 is rotatably received on the said boss 38 and, more specifically, on the said reduced portion 39. This pinion is enmeshed with the said relatively large gear 36 for actuation thereof.

A small sleeve 42 is formed integral with the said pinion 40 for accommodation of an actuation rod or handle. Further, the said gear may be secured to the reduced portion 39 by means of a conventional screw 44 or the like. In this construction, the reduced portion 39 may then assume duty of a stub shaft, being rotatable in the interior portion of the lug 38.

It may now be seen that upon rotation of the pinion 40, the relatively large gear 36 will also be correspondingly rotated. The journaling of the said relatively large gear 36 may be seen best in Figure 2 wherein there is disclosed an annular shoulder 46 formed integral with the said gear 36 having arcuate segmental rings 48 secured thereto through the medium of conventional screws or the like. These segmental rings are seated in a recess 50 formed in the said housing 20 and especially adapted to accommodate the said segmental arcuate sections of a ring. By this construction, it is readily apparent that the relatively large gear 36 is permitted of rotational movement about the housing 20, yet movement axially of the housing is prohibited.

As the said gear 36 is rotated, the lug or key 34 cooperating in the said slot 32 prohibits rotative movement of the gear 36 relative to the sleeve 30. Said sleeve 30 is threadedly received in the said housing 20; the only allowed or permitted movement is axial relative to the housing 20. Consequently, this expedient is utilized for urging the sleeve 30 interior of and from the said housing. In order to prevent further mutual rotation of the housing 20 and a block 54, the fingers or arms 26 and 28 of the cap 30 extend within recesses 52 (see Fig. 5), which recesses are supplied in the bearing block 54. This bearing block is preferably substantially cylindrical in exterior configuration with a reduced portion 56 provided therein for reduction of surface contact of the said bearing block 54 and the bore of the said sleeve 30.

A bore 60 is formed centrally of the said bearing block 54 and has a plunger or piston 62 slidably received therein. This plunger or piston in turn has a counterbore which is internally threaded in order to accommodate a screw 64. This screw has a ball joint 66 at one end thereof for accommodation of a socket 68 which is formed integral with a foot 70. Said foot 70 may have protuberances 72 on the under surface thereof in order to grip the ground or other surface firmly in raising and lowering selected portions of a vehicle.

In order to actuate the said plunger, hydraulic means is provided. The hydraulic means associated with the jack per se may be seen best in Figure 2, wherein there is disclosed a pair of passages 74 and 76 respectively extending longitudinally of the said block 54. These passages terminate in the lower portion of the said bore 60 for application of fluid to the under surface of the piston head on the said piston or plunger. By applying liquid under pressure in the tubes 80 and 82, respectively, which extend through the cap 22, the plunger 62 may be raised.

An inlet conduit 84 extends through the said cap 22 and has a substantial externally threaded collar 86 rigidly secured to the conduit 84 and engages the under surface of the said cap 22. The threads of the said collar 86 are engaged with complemental threads formed in the said bore 60, thereby assisting to maintain the bearing block 54 in position within the said housing. Of course, fluid applied under pressure through the said conduit 84 will urge the piston 62 exteriorly of the said bore 60. A shoulder 88 is formed at the lower portion of the said bore 60 for limiting the axial travel of the said plunger 62.

Any suitable bracket such as the bracket 90 may be used for attaching the said housing 20 firmly to one of the axle housings, a portion of the chassis channel iron or the like. The preferred construction may be seen best in Figure 2.

Means for applying liquid under pressure to the jacks selectively is provided. For this construction, attention is directed to Figure 1 wherein there is disclosed a conventional pump 92 which may either be foot-actuated, manually operative, or motor-driven (automotive vehicle engine), as desired. A manifold, generally indicated at 94, is supplied with various conduits extending therefrom and a plurality of valves generally indicated at 96 therein. By selection of the valve 96, fluid may be directed to any one of the wheel jacks which are associated with the vehicle. Since the structure is identical in this respect, a description of the direction of fluid to one jack will necessarily lead to a clear understanding of the direction of fluid to all of the jacks. It is seen that the lines or conduits 80 and 82, respectively, terminate in a main line 98 which extends to one side or port 100 of one of the valves 96. By the movement of the core 102 which is in the valve 96, the two passages 104 and 106 respectively may be aligned in a desired manner in order to align certain other ports 108, 109 and 110 in communication. Therefore, fluid urged under pressure by the pump 92 and through the plenum chamber 112 may extend through the manifold and be directed within the conduit 98, thence to the channels or passages 74 and 76. At the same time, however, due to the arrangement of passages in the valve 96, the fluid on the top surface of the said piston 62 is urged through the conduit 84, thence through the valve 96 and into another portion of the manifold for recirculation by the pump 92. Of course, the valve 96 (being described) may be adjusted to a selected position, whereby all of the ports are closed and the jack appurtenant to the valve being described will be maintained in the position which is desired.

From the foregoing, it is believed that a clear understanding of the operation and function of the present invention is apparent. Also, it is readily appreciated that certain variations may be made without departing from the spirit of the invention. Therefore, limitation is sought only in accordance with the scope of the following claims.

Having described the invention, what is claimed as new is:

1. In a vehicle including an under-carriage, wheel lifts for each wheel, each lift comprising an internally threaded housing adapted to be secured to the under-carriage adjacent each wheel, a sleeve having a keyway and threadedly received in said housing, mechanical means rotatably secured to the outside of said housing and disposed in part in said keyway for urging said sleeve from said housing, a block secured in said housing and within said sleeve, a piston in said block, means for actuating said piston, and an extension adjustably secured in said piston.

2. In a vehicle including an under-carriage, wheel lifts for each wheel, each lift comprising an internally threaded housing adapted to be secured to the under-carriage adjacent each wheel, a sleeve having a keyway and threadedly received in said housing, mechanical means rotatably secured to said housing and disposed in part in said keyway for urging said sleeve from said housing, a block secured in said housing and within said sleeve, a piston in said block, means for actuating said piston, and means secured to said housing for preventing relative rotation of said block and said housing.

3. In a vehicle including an under-carriage, wheel lifts for each wheel, each lift comprising an internally threaded housing adapted to be secured to the under-carriage adjacent each wheel, a sleeve having a keyway and threadedly received in said housing, mechanical means carried by said housing and disposed in part in said keyway for urging said sleeve from said housing, a block disposed in said housing and within said sleeve, a piston in said block, means for actuating said piston, means secured to said housing for preventing relative rotation of said block and said housing, said mechanical means including a gear, means for rotatively securing said gear to said housing, a pin secured to said gear and seated in said keyway, a pinion journaled on said housing enmeshed with said gear, said piston actuation means including a fluid source, and passages in said block communicating with the source and opposite faces of said piston.

4. In a vehicle including an under-carriage, wheel lifts for each wheel, each lift comprising an internally threaded housing adapted to be secured to the under-carriage adjacent each wheel, a sleeve having a keyway and threadedly received in said housing, mechanical means carried by said housing and disposed in part in said keyway for urging said sleeve from said housing, a block secured in said housing and within said sleeve, a piston in said block, means for actuating said piston, means secured to said housing for preventing relative rotation of said block and said housing, said mechanical means including a gear, means for rotatively securing said gear to said housing, a pin secured to said gear and seated in said keyway, and a pinion journaled on said housing enmeshed with said gear.

5. For use with a vehicle, a lift comprising an internally threaded housing, an externally threaded sleeve disposed in said housing and having the threads thereof enmeshed with the threads of said internally threaded housing, said sleeve having a longitudinal keyway, a gear, means for rotatably securing said gear to said housing, said securing means comprising a ring fixed to said gear and disposed in a groove in the exterior of said housing, a key fixed to said gear and disposed in said keyway, thereby preventing rotative movement of said gear with respect to said sleeve, a bearing block disposed in the bore of said sleeve and having a piston disposed therein, means operatively connected with said housing for actuating said piston, means secured to said housing and operatively connected with said bearing block for preventing rotation of said bearing block with respect to said housing when said sleeve is rotated.

TROY D. ENSEY.
MARSHALL SIMMONS.

REFERENCES CITED

The following references are of record in the file of this patent:

UNITED STATES PATENTS

| Number | Name | Date |
| --- | --- | --- |
| 1,794,675 | Dennert et al. | Mar. 3, 1931 |
| 1,918,426 | Radnor | July 18, 1933 |
| 2,241,877 | Contrino et al. | May 13, 1941 |
| 2,277,908 | Hess et al. | Mar. 31, 1942 |

FOREIGN PATENTS

| Number | Country | Date |
| --- | --- | --- |
| 369,944 | Italy | Apr. 4, 1939 |